United States Patent [19]

De Luca

[11] 4,092,700

[45] May 30, 1978

[54] TELEPHONE CONNECTOR BLOCK GUIDE

[75] Inventor: Paul V. De Luca, Port Washington, N.Y.

[73] Assignee: Porta Systems Corp., Syosset, N.Y.

[21] Appl. No.: 716,434

[22] Filed: Aug. 23, 1976

[51] Int. Cl.$^2$ .......... H02B 9/00

[52] U.S. Cl. .......... 361/428; 361/426

[58] Field of Search .......... 361/426, 427, 428, 355; 339/198 GA

[56] References Cited

U.S. PATENT DOCUMENTS

| | | | |
|---|---|---|---|
| 1,122,290 | 12/1914 | Mack et al. | 361/426 |
| 2,317,450 | 4/1943 | Folds et al. | 361/426 X |
| 3,259,876 | 7/1966 | Norden | 339/198 GA |
| 3,648,219 | 3/1972 | Goldman | 339/198 GA X |
| 3,936,133 | 2/1976 | Splitt et al. | 361/426 X |

*Primary Examiner*—J D Miller

*Assistant Examiner*—Peter S. Wong

*Attorney, Agent, or Firm*—Charles E. Temko

[57] ABSTRACT

An elongated combination guide and shield of flexible synthetic resinous insulated material adapted to be engaged and maintained by groups of terminal pins on a telephone connector block. The devices serve the purposes of separating individual groups of conductors for ready identification, and shield the hands of service personnel from accidental contact with the projecting ends of said pins while working on an adjacent block. The devices include a pair of parallel side walls interconnected by a bottom or base wall having openings for resiliently engaging said pins at predetermined intervals along the principal axis thereof. The side walls contain slots for the entry of tools for selective pin removal and replacement, without the necessity of removal of the guide or unaffected wiring.

4 Claims, 6 Drawing Figures

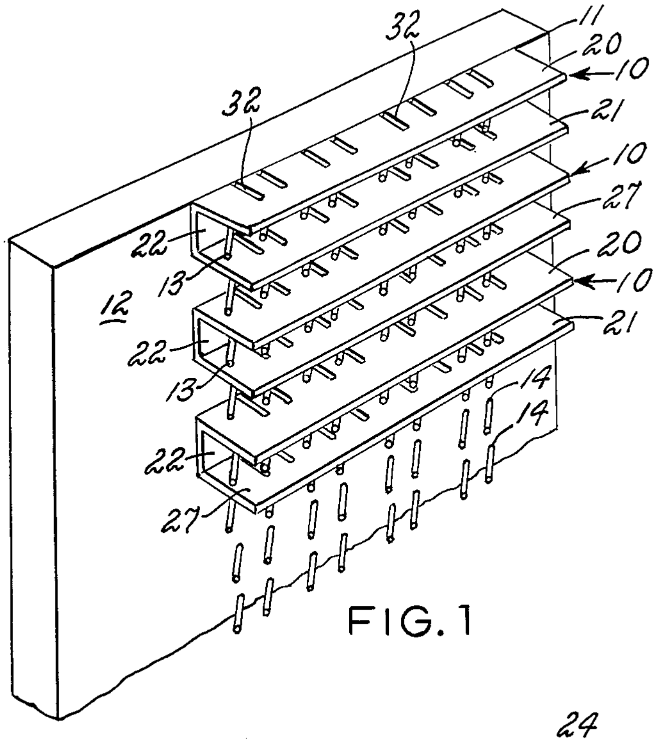
FIG. 1
FIG. 6
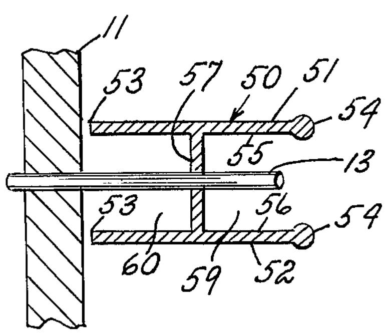
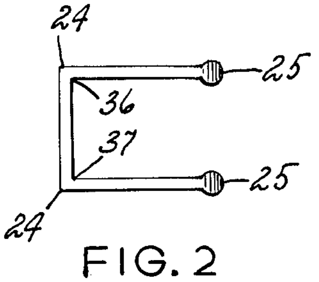
FIG. 2
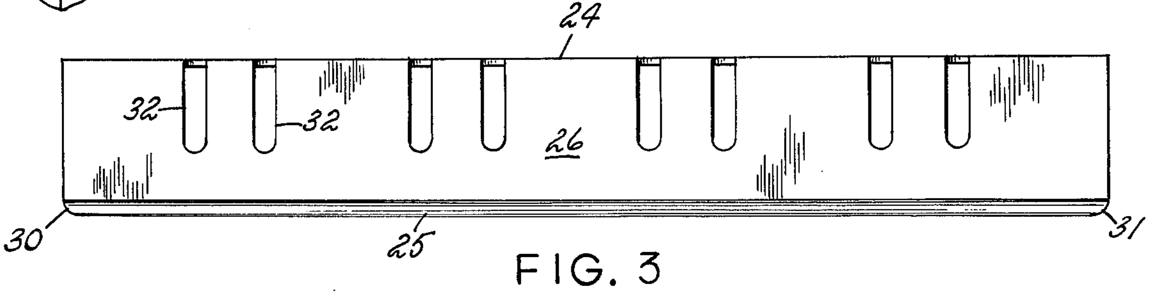
FIG. 3
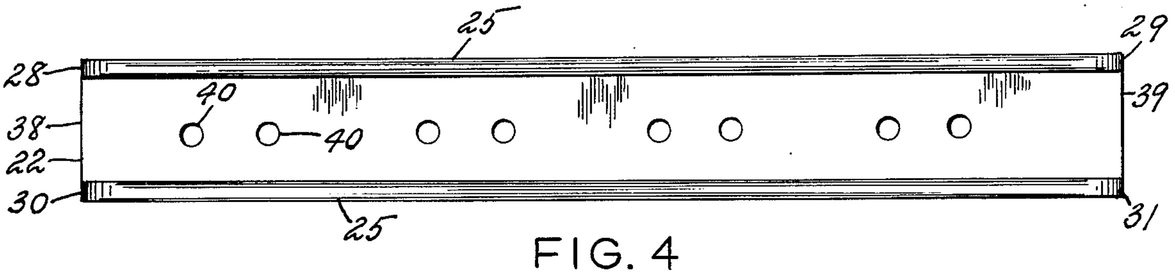
FIG. 4
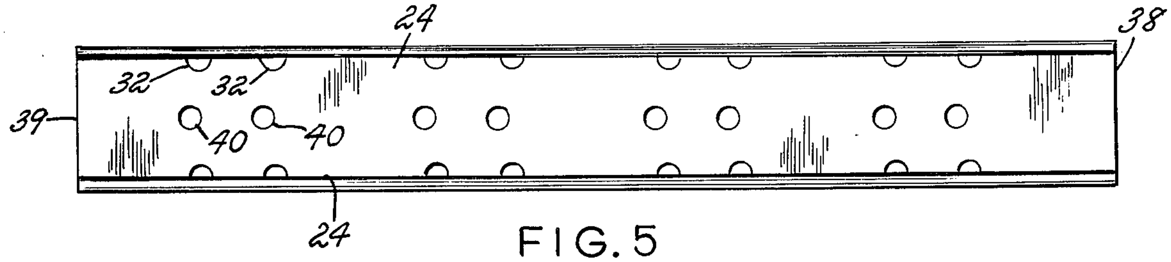
FIG. 5

TELEPHONE CONNECTOR BLOCK GUIDE

BACKGROUND OF THE INVENTION

With the ever increasing number of telephone subscribers, continuous efforts have been made in the design of telephone connector blocks normally installed in telephone offices, to accommodate greater numbers of pin terminals per unit area. The increase in pin terminal density has been achieved to a considerable degree, but this desired result has also resulted in corresponding complication in the installation and maintenance of telephone circuits, owing to greater conductor density and more limited access space. Circuits are more difficult to trace, and because connector blocks are positioned very close to each other, it is necessary for service personnel to work with great care in order to avoid injury by contacting the exposed pins on the surface of an adjacent connector block. From the standpoint of simplifying service, little has been accomplished in the direction of protecting service personnel against injury, and in the area of facilitating circuit tracing.

SUMMARY OF THE INVENTION

Briefly stated, the invention contemplates the provision of an improved telephone connector block guide which provides the multiple functions of shielding terminal pins from accidental contact by service personnel, compartmentalizing groups of related conductors, and substantially simplifying circuit tracing. The device comprises a unitary molding or extrusion of insulated synthetic resinous material including a base or bottom wall having a series of openings therein resiliently engaging projecting contact pins to be retained thereby. A pair of parallel side walls extend laterally outwardly from the base wall, the free beaded edges thereof serving to shield a group of pins and conductors attached thereto from contact with any object of a size greater than the width of the interstice formed therebetween. The synthetic resinous material is preferably clear, permitting convenient viewing and wire tracing. Slots in the side walls allow for the insertion of tools permitting selective removal and replacement of pins without the necessity of detaching the shield or disconnecting conductors which are not involved in repair.

BRIEF DESCRIPTION OF THE DRAWING

In the drawing, to which reference will be made in the specification, similar reference characters have been employed to designate corresponding parts throughout the several views.

FIG. 1 is a view in perspective of a first embodiment of the invention, showing a plurality of devices in installed condition upon a known telephone connector block.

FIG. 2 is an end elevational view of an individual device.

FIG. 3 is a top plan view thereof.

FIG. 4 is a side elevational view thereof.

FIG. 5 is a side elevational view thereof, showing the side opposite that seen in FIG. 4.

FIG. 6 is a sectional view showing a second embodiment of the invention.

DETAILED DECRIPTION OF THE DISCLOSED EMBODIMENTS

In accordance with the invention, the first embodiment thereof, generally indicated by reference character 10, is illustrated in FIG. 1 in engaged condition with respect to a known telephone connector block 11, the operative surface 12 of which is provided with a plurality of projecting conductive pins 13 arranged in horizontally disposed rows 14.

Each device 10 is formed as a unitary casting or extrusion from non-conductive synthetic resinous materials, such as polystyrene, polypropylene, polyethylene, or other suitable synthetic resinous materials. Each device includes first and second side walls 20 and 21, respectively, interconnected by a base wall 22.

The side walls 20–21 are bounded by inner edges 24, outer, preferably beaded, edges 25, an outer surface 26 and an inner surface 27. End edges 28 and 29 are preferably rounded in the area of the outer edges 25, as indicated by reference characters 30 and 31 (FIGS. 3 and 4). As best seen in FIGS. 3 and 5, elongated slots 32 extend from the base wall 22 in a direction toward the edges 25 at periodic intervals, to permit the insertion of tools for removal of pins 13 and replacement thereof as required, without the necessity of disengaging the entire device 10.

The base wall 22 is bounded by first and second longitudinal edges 36 and 37, respectively, as well as end edges 38 and 39. Through openings 40 correspond in diameter to that of the pins 13, to permit the device 10 to be resiliently retained by engagement therewith.

It will be apparent from a consideration of FIGS. 1 and 2 that the beaded edges 25 of any single device protect the hands of service personnel when such personnel are working on the pins and associated conductors of an oppositely facing connector block (not shown). Under such circumstances, it is normally the backs of the hands which, if great care is not taken, will come into contact with oppositely facing pins on an adjacent block. As the hands will normally be much wider than any interstice defined between the side walls, or between adjacent devices 10, effective shielding is accomplished without diminishing access to any pins on any connector block.

Turning now to the second embodiment of the invention, shown in FIG. 6, the device, generally indicated by reference character 50 comprises first and second side walls 51 and 52, respectively, each bounded by an inner edge 53 and an outer beaded edge 54, as well as inner and outer surfaces 55 and 56, respectively. The base wall 57, unlike that of the first embodiment, is medially positioned to form an outer interstice 59 and an inner interstice 60, permitting the isolation of individual groups of wires (not shown) for easy tracing. The second embodiment is engaged upon the pins in the same manner as the first embodiment, and the device is installed after part of the wiring has been accomplished.

I wish it to be understood that I do not consider the invention limited to the precise details of structure shown and set forth in this specification, for obvious modifications will occur to those skilled in the art to which the invention pertains.

I claim:

1. In combination, a telephone connector block having an exposed planar surface and a plurality of conductive pins projecting outwardly from said surface; and a conductor wire guide comprising a unitary body of non-conductive synthetic resinous material having a principal axis, said body having an axially oriented base wall having inner and outer surfaces and a plurality of resilient pin-engaging openings extending through said base wall between said inner and outer surfaces; said base wall having first and second longitudinal edges, first and second side walls extending laterally from said first and second edges, said side walls having third and fourth longitudinally extending mutually parallel free edges; said guide being frictionally engaged upon said pins, whereby said side walls define an interstice within which conductors may be engaged upon at least some of said pins.

2. The combination in accordance with claim 1, further characterized in said side walls having slotted openings extending through the plane thereof for the selective insertion of tools therethrough.

3. The combination in accordance with claim 1, further characterized in said third and fourth edges each having a beaded rounded surface.

4. The combination in accordance with claim 1, further characterized in said base wall being positioned medially of said side walls to define a second longitudinally extending interstice on an opposite side of said base wall.

* * * * *